(12) United States Patent
Li et al.

(10) Patent No.: US 11,929,832 B2
(45) Date of Patent: Mar. 12, 2024

(54) HYBRID AUTOMATIC REPEAT REQUEST ACKNOWLEDGEMENT [HARQ-ACK] FEEDBACK TECHNIQUES

(71) Applicant: ZTE Corporation, Guangdong (CN)

(72) Inventors: Xincai Li, Guangdong (CN); Yajun Zhao, Guangdong (CN)

(73) Assignee: ZTE Corporation, Guangdong (CN)

(*) Notice: Subject to any disclaimer, the term of this patent is extended or adjusted under 35 U.S.C. 154(b) by 393 days.

(21) Appl. No.: 17/350,851

(22) Filed: Jun. 17, 2021

(65) Prior Publication Data
US 2021/0314102 A1 Oct. 7, 2021

Related U.S. Application Data

(63) Continuation of application No. PCT/CN2018/122773, filed on Dec. 21, 2018.

(51) Int. Cl.
| | |
|---|---|
| *H04W 4/00* | (2018.01) |
| *H04B 7/0456* | (2017.01) |
| *H04L 1/1812* | (2023.01) |
| *H04L 1/1867* | (2023.01) |
| *H04W 72/1268* | (2023.01) |
| *H04W 72/23* | (2023.01) |

(52) U.S. Cl.
CPC ......... *H04L 1/1819* (2013.01); *H04B 7/0456* (2013.01); *H04L 1/1896* (2013.01); *H04W 72/1268* (2013.01); *H04W 72/23* (2023.01)

(58) Field of Classification Search
CPC ... H04L 1/1819; H04L 1/1896; H04L 1/1861; H04L 1/1614; H04B 7/0456; H04W 72/1268; H04W 72/23

USPC ......................................... 370/329, 330, 328
See application file for complete search history.

(56) References Cited

U.S. PATENT DOCUMENTS

| | | | |
|---|---|---|---|
| 10,383,103 | B2 | 8/2019 | Park et al. |
| 2017/0223554 | A1 | 8/2017 | Chou et al. |
| 2017/0273056 | A1* | 9/2017 | Papasakellariou .. H04W 52/146 |
| 2019/0246391 | A1* | 8/2019 | Zhang ................. H04L 27/0006 |

(Continued)

FOREIGN PATENT DOCUMENTS

| | | |
|---|---|---|
| CN | 104396174 A | 3/2015 |
| CN | 105391484 A | 3/2016 |

(Continued)

OTHER PUBLICATIONS

European Search Report for EP Patent Application No. 18930229.2, dated Dec. 6, 2021 (7 pages).

(Continued)

*Primary Examiner* — Chuong T Ho
(74) *Attorney, Agent, or Firm* — Perkins Coie LLP

(57) ABSTRACT

Techniques are described to feedback hybrid automatic repeat request acknowledgement (HARQ-ACK) codebook. For example, a base station can send HARQ-ACK codebook information to a user equipment, schedule retransmission, and transmit a downlink feedback information (DFI) if the user equipment transmits a code block group (CBG) based autonomous transmission. Techniques are also described for a user equipment to improve the feedback HARQ-ACK efficiency for downlink physical downlink shared channel (PDSCH) transmission.

20 Claims, 8 Drawing Sheets

(56) References Cited

U.S. PATENT DOCUMENTS

| | | | | |
|---|---|---|---|---|
| 2019/0306923 | A1* | 10/2019 | Xiong | H04J 13/0062 |
| 2020/0084789 | A1 | 3/2020 | Wang et al. | |
| 2020/0259599 | A1* | 8/2020 | Zhang | H04L 1/1864 |
| 2023/0354215 | A1* | 11/2023 | Huang | H04W 52/365 |

FOREIGN PATENT DOCUMENTS

| | | |
|---|---|---|
| CN | 106549734 A | 3/2017 |
| CN | 107667565 A | 2/2018 |
| CN | 108809534 A | 11/2018 |
| WO | 2018/170001 A1 | 9/2018 |
| WO | 2018161951 A1 | 9/2018 |

OTHER PUBLICATIONS

Intel Corporation, "Remaining Details for HARQ for Autonomous Uplink Transmissions," 3GPP TSG RAN WG1 Meeting #92, R1-1802361, Athens, Greece, Feb. 26-Mar. 2, 2018, 4 pages.

Co-Pending Korean Application No. 10-2021-7022168, dated May 17, 2023, 6 pages with unofficial translated summary.

Co-Pending Indonesian Application No. P00202105541, dated Jun. 19, 2023, 4 pages with unofficial translated summary.

CNIPA, Notification to Complete Formalities of Registration for Chinese Application No. 201880100416.7, dated Jan. 9, 2023, 6 pages with unofficial translation.

International Search Report and Written Opinion dated Sep. 11, 2019 for International Application No. PCT/CN2018/122773, filed on Dec. 21, 2018 (6 pages).

Co-Pending Chinese Application No. 201880100416.7, Office Action dated May 15, 2022, 14 pages with unofficial translation.

OPPO "Considerations on configured grant for NR-U" R1-1812804, Spokane, USA, Nov. 12-16, 2018, 3 pages.

Intel Corporation, et al. "Remaining Details for HARQ for Autonomous Uplink Transmissions," R1-1720028, Reno, Nevada, USA Nov. 27-Dec. 1, 3 pages.

Nokia et al., "WF AUL ARQ and RA" 3GPP TSG RAN1 #91, Reno, US, Nov. 27-Dec. 1, 2017, R1-1721279, 4 pages.

Nokia "List of agreements for up to RAN1#92" R1-1803177, Athens, Greece, Feb. 26-Mar. 2, 2018 16 pages.

Samsung "HARQ for AUL" R1-1801916 Athens, Greece, Feb. 26-Mar. 2, 2018, 3 pages.

Samsung "HARQ for autonomous UL access," Reno, USA, Nov. 27-Dec. 1, 2017, R1-1720247, 3 pages.

Qualcomm, "Remaining details of HARQ for AUL" R1-1802315, Athens, Greece, Feb. 26-Mar. 2, 2018, 1 page.

Co-Pending EP Application No. 18930229.2, Intention to Grant under Rule 71(3) dated Mar. 15, 2023, 8 pages.

* cited by examiner

HYBRID AUTOMATIC REPEAT REQUEST ACKNOWLEDGEMENT [HARQ-ACK] FEEDBACK TECHNIQUES

CROSS-REFERENCE TO RELATED APPLICATIONS

This application is a continuation of International Patent Application No. PCT/CN2018/122773, filed on Dec. 21, 2018, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed to feedback hybrid automatic repeat request acknowledgement (HARQ-ACK) codebook. An exemplary embodiment includes a wireless communication method. The exemplary method includes receiving, by a communication node a trigger signal from a network node, and transmitting, after receiving the trigger signal, a HARQ-ACK codebook to the network node using a control channel or a data channel. In some embodiments, the transmission of the HARQ-ACK codebook includes an acknowledgement (ACK) information or a non-acknowledgement (NACK) information of: a current channel occupancy time (COT), or a previous COT corresponding to a physical downlink shared channel (PDSCH). In some embodiments, the transmission of the HARQ-ACK codebook includes an indication that the HARQ-ACK codebook is a re-transmission.

In some embodiments, the transmitting of the HARQ-ACK codebook is performed by: (1) transmitting the HARQ-ACK codebook in response to receiving a downlink control information (DCI) trigger or request, where the DCI is a dedicated radio network temporary identifier (RNTI) scrambled DCI or a new DCI format bearer, where the DCI includes information related to a number of COTs, a HARQ process group identifier, HARQ processes needed to transmit the HARQ-ACK codebook of a retransmission using a HARQ process bitmap, a slot number, a slot combination or a slot group identifier (ID), or a code block group transmission information (CBGTI) information, where the CBGTI informs the communication node which code block group (CBG) HARQ-ACK of a certain HARQ process is needed to be fed back; or (2) determining, by the communication node, a time slot for transmitting the HARQ-ACK codebook, where the time slot is determined according to three bits of a physical downlink shared channel (PDSCH)-to-HARQ-timing-indicator in the DCI, where one bit of the three bits indicates that either a same shared channel occupancy time (COT) feedback or a cross-COT feedback is selected, where two other bits of the three bits indicate a size of a timing amount, where in response the one bit indicating the same shared COT feedback, the timing amount is a number of timing slots relative to a slot where the DCI is located, where in response to the one bit indicating the cross-COT feedback, a transmission time of the HARQ-ACK codebook is a position relative to the trigger signal and the timing amount is a number of offset time slots relative to a time slot of the trigger signal; or (3) determining a time domain location of the HARQ-ACK codebook by using a two-step trigger, where in response to a first DCI containing a timing amount that is offset relative to a second DCI or relative to a dedicated signal, the time domain location of the HARQ-ACK codebook depends on the second DCI or a transmission time of the particular signal sent by the network node, where the communication node receives the second DCI or the dedicated signal according to an offset indicated in the first DCI.

In another exemplary embodiment, a wireless communication method includes receiving, by a network node, a data transmission from a communication node; and transmitting to the communication node a hybrid automatic repeat request acknowledgement (HARQ-ACK) codebook using a downlink control information (DCI), where the HARQ-ACK codebook is based on the received data transmission.

In some embodiments, the received data transmission includes a plurality of code block groups (CBGs) based physical uplink shared channel (PUSCH) autonomous transmission, and the network node transmits the HARQ-ACK codebook by: (1) the network node transmits the HARQ-ACK codebook that corresponds to at least one transport block (TB) for PUSCH autonomous transmission, and a corresponding acknowledgement (ACK) information or non-acknowledgement (NACK) information that is sequentially cascaded according to the PUSCH autonomous transmission, where the ACK information or the NACK information is carried by a downlink feedback information (DFI), and where the DCI is used to schedule re-transmission of the CBGs of the TB, and where the TB includes the CBGs; or (2) the network node adopts a joint feedback mode where the HARQ-ACK codebook includes information for the TB and the CBGs, where the HARQ-ACK codebook is carried by the DFI; or (3) the network node transmits the HARQ-ACK codebook that includes information for the CBGs and excludes information for the TB.

In some embodiments, the network node adopts the joint feedback mode by having: (1) the HARQ-ACK codebook include the ACK information or the NACK information associated with the TB and the CBGs configured for all autonomous transmission processes of the communication node, where the ACK information or the NACK information of the TB is formed according to a HARQ process bitmap, and where the ACK information or the NACK information of the CBGs is formed according to a CBG bitmap and sequentially cascaded corresponding to each TB; or (2) the HARQ-ACK codebook correspond to a number of pre-configured data transmission opportunities in a pre-configured time window, where the HARQ-ACK codebook includes information related to the TB and the cascaded feedback of the CBGs, where the network node transmits the HARQ-ACK codebook that includes the NACK information in response to detecting an absence of PUSCH transmission in a transmission opportunity, and where the communication node refrains from performing data transmission in the transmission opportunity.

In some embodiments, the HARQ-ACK codebook of the joint feedback mode is a dynamic HARQ-ACK codebook, the network node receives an uplink allocation information (UAI) to carry the HARQ-ACK codebook feedback related information to be fed back by the network node in the DFI, and the network node transmits the HARQ-ACK codebook by sending a bitmap of the TB and then sending the ACK information or the NACK information associated with each CB G of the TB.

In some embodiments, the UAI belongs to an uplink control information (UCI) and is carried by a physical uplink control channel (PUCCH) or the PUSCH, and a number of the CBGs is indicated by using the CBG transmission information (CBGTI) received by the network node. In some embodiments, the network node adopts the joint feedback mode by independently coding the ACK information or the NACK information for the TB and the ACK information or the NACK information for at least some of the CBGs, the HARQ-ACK codebook information for the CBGs includes the NACK information for the at least some of the CBGs of the TB in response to the at least some of the CBGs being incorrectly decoded, and the HARQ-ACK codebook information for the CBGs does not include the ACK information for the CBGs in response to all of the CBGs of the TB being correctly decoded.

In some embodiments, the HARQ-ACK codebook that includes information for the CBGs and excludes information for the TB includes: (1) a one-bit ACK information or NACK information is provided for each CBG of each TB, where the NACK information is sent for a CBG not received by the network node, or (2) the HARQ-ACK codebook for the CBGs includes the ACK information or the NACK information, and the network node refrains from transmitting the HARQ-ACK codebook in response to detecting an absence of a CBG sent by the communication node, where the network node receives the CBG transmission information (CBGTI) through an uplink control information (UCI) and the data transmission.

In some embodiments, the DFI is carried by a DCI format corresponding to a physical downlink control channel (PDCCH). In some embodiments, a time domain location of the DFI is determined by: (1) the time domain location of the DFI is indicated by a channel occupancy time (COT) sharing information in an uplink control information (UCI), where the time domain location of the DFI is a sum of a slot number n and a offset slot number k, where n is associated with a location of the DCI corresponding to a search space of a semi-static configuration, where k is indicated by the DCI; or (2) transmission slots of the DFI is offset by two or three slots from a left position or a right position of the search space of the semi-static configuration. In some embodiments, a time domain location of DFI includes: (1) a first downlink time slot after an end of the autonomous transmission, where the first downlink time slot and the autonomous transmission belong to a same shared channel occupancy time (COT); or (2) a first time slot after a successful channel access performed by the network node.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
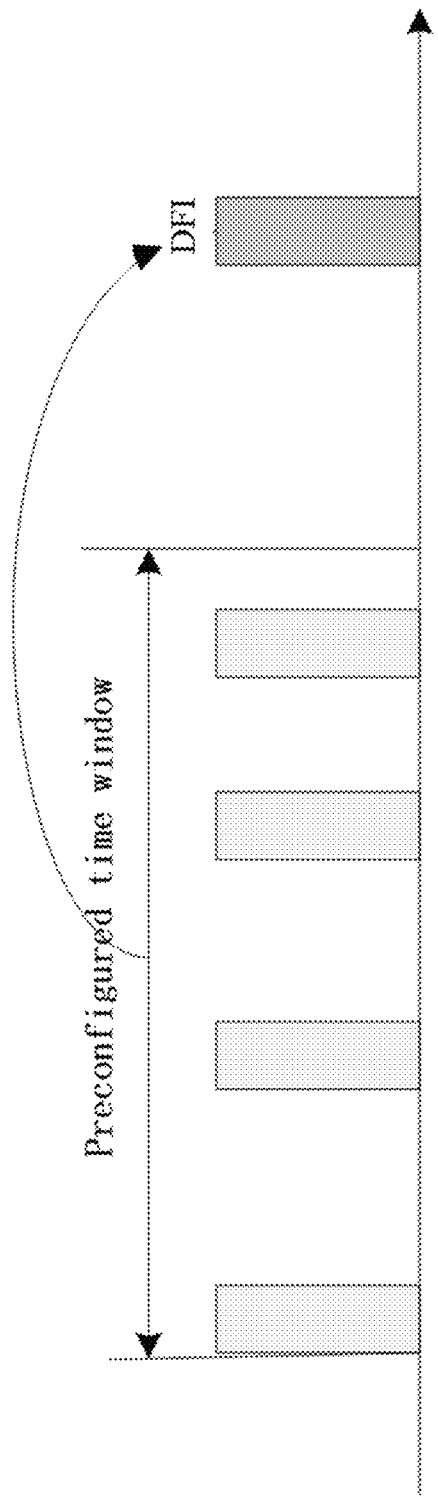
FIG. 1 shows a timing diagram for a technique to feedback hybrid automatic repeat request acknowledgment (HARQ-ACK).

New Radio's (NR's) use of unlicensed carrier operations, known as NR-U, has been researched in 3GPP. One of the unlicensed carrier operations being researched is to standardize the process of using unlicensed NR work deployments. Currently, it is a consensus that NR uplinks can support code block group (CBG) based unscheduled transmission. When NR uplinks are scheduled to introduce CBG data transmission, the process for the base station to feedback the corresponding hybrid automatic repeat request acknowledgment (HARQ-ACK) of CBG uplink autonomous transmission is a technical problem that is yet to be solved. In addition, the process to improve the HARQ-ACK feedback efficiency of the user equipment (UE) for the physical downlink shared channel (PDSCH) transmitted by the base station is also a technical problem that is yet to be solved. These technical problems, among others, will be addressed in this patent document.

NRs face many problems when using unlicensed carriers. First, in some countries and regions, there are corresponding regulatory policies for the use of unlicensed spectrum. For example, a device must perform Listening Before Talk (LBT, also called Clear Channel Assessment (CCA)) before sending data using an unlicensed carrier or having a channel connection, and only devices with successful LBT can send data on the unlicensed carrier. At present, two LBT mechanisms are standardized for the device access non-authorization technology, one is a type 4 LBT mechanism with random backoff, and the other is a type 2 LBT mechanism without random backoff (execution only) listening for a predefined period of time). The UE performs a similar channel access procedure before performing an uplink autonomous transmission (or called scheduling-free, or configuration authorization) and before performing HARQ-ACK feedback on the downlink transmission data.

For NR uplink, there are two transmission mechanisms, one is based on base station scheduling, which can support CBG scheduled transmission, and the other is scheduling-free, where only Transport Block (TB) is supported and CBG transmission is not supported, and where one TB includes multiple CBGs. The HARQ mechanism for the uplink unscheduled transmission (which may also be referred to as autonomous transmission, which is called the configuration authorization configured grant) is that the UE assumes an ACK condition if the UE does not receive the downlink control information (DCI) of the scheduled retransmission sent by the base station in a configured timer, so there is no ACK/NACK feedback information explicitly sent by the base station.

This patent document describes at least two techniques for improving HARQ-ACK feedback. First, this patent document will address the problem of how the base station feeds back or sends back HARQ-ACK information to the UE, how to schedule retransmission, and how the downlink feedback information is transmitted if the NR uplink UE is based on CBG-based autonomous transmission (also known as unscheduled transmission). Next, this patent document will address how the UE can improve the feedback HARQ-ACK efficiency for downlink PDSCH transmission.

The exemplary HARQ-ACK feedback and transmission methods includes an uplink HARQ-ACK feedback and a downlink HARQ-ACK feedback, which are respectively described in Sections I and II below. The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Section I—Uplink HARQ-ACK Feedback Techniques

This section describes techniques related to a plurality of CBGs-based scheduling-free autonomous transmission of the uplink NR where the base station feeds back to the UE the HARQ-ACK codebook and scheduling retransmission problems, and where the HARQ-ACK codebook can be included in the downlink feedback information (DFI).

For the uplink UE CBG-based physical uplink shared channel (PUSCH) autonomous transmission, the base station can perform a HARQ-ACK information feedback and scheduling retransmission using one of the following three methods:

Method 1: The base station feeds back to the UE the TB-level HARQ-ACK corresponding to each transmitted PUSCH, and the corresponding ACK information or NACK information is cascaded according to the PUSCH transmission sequence and then carried by the downlink feedback information (DFI). If at least some of the CBGs (e.g., 1 CBG) in the TB is to be retransmitted, then retransmission of the CBGs is performed by separate DCI scheduling.

Method 2: The base station adopts the TB level and CBGs joint feedback HARQ-ACK feedback mode, that is the TB level feedback and then the CBGs feedback. The HARQ-ACK feedback is carried by the downlink feedback information DFI. Specifically, Method 2 includes the following four options. Any one of the following four options may be employed in Method 2.

Figure 5:
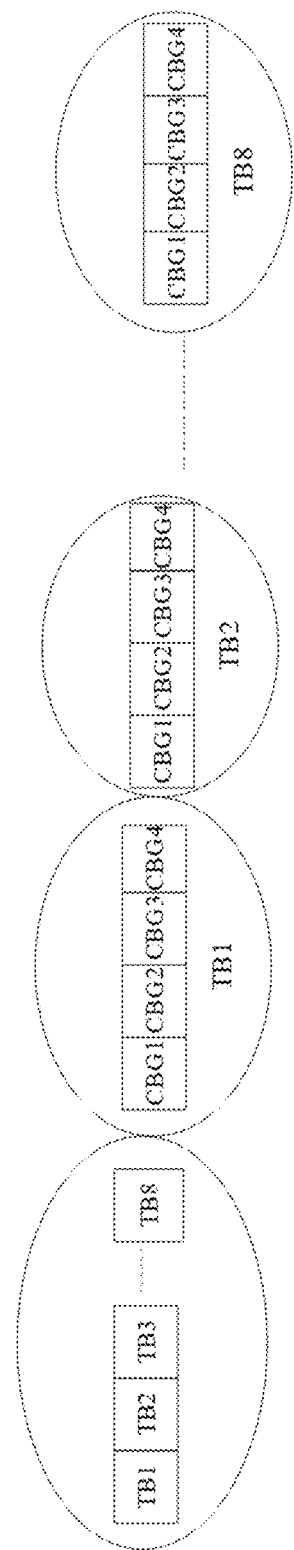
FIG. 5 shows an acknowledgement (ACK) information or a non-acknowledgment (NACK) information ordered in a sequentially cascading manner of code block groups (CBGs) corresponding to each TB.

Option 1: The HARQ-ACK codebook fed back by the base station is an ACK/NACK feedback of the TB level and CBGs level configured for all uplink autonomous transmission HARQ processes of the UE, that is, the HARQ-ACK feedback codebook mode of the semi-static TB and CBGs. The following implementation example further describes Option 1 (and corresponds to Application Example 1 section below in this patent document). As an example, the network side (e.g., the base station) can configure eight HARQ processes for uplink autonomous transmission for the UE, and can configure the number of CBGs included in each TB to be four. When the base station feeds back the HARQ-ACK codebook for the autonomous transmission of the uplink, the codebook is composed of an ACK/NACK of an 8-bit TB-level HARQ process bitmap, and then an ACK/NACK of a 4*8-bit CBG bitmap, that is, an ACK/NACK ordered in a sequentially cascading manner of CBGs corresponding to each TB as shown in FIG. 5.

Option 2: The HARQ-ACK semi-static codebook size fed back by the base station is a HARQ-ACK feedback corresponding to the number of pre-configured data transmission opportunities in a pre-configured time window. The feedback includes cascading of the TB level transmitted in the time window and the cascaded feedback of the CBG, where the base station sends a HARQ-ACK codebook including NACK information in a transmission opportunity that is not used by a UE for data transmission, and where the base station sends the HARQ-ACK codebook in response to detecting an absence of PUSCH transmission in the transmission opportunity.

FIG. 1 shows a timing diagram for a technique to feedback HARQ-ACK codebook according to Option 2. In FIG. 1, there are four transmission opportunities in a pre-configured time window, where each TB contains 2 CBGs, and the number of bits corresponding to the DFI is 4+2*4=12 bits.

Figure 2:
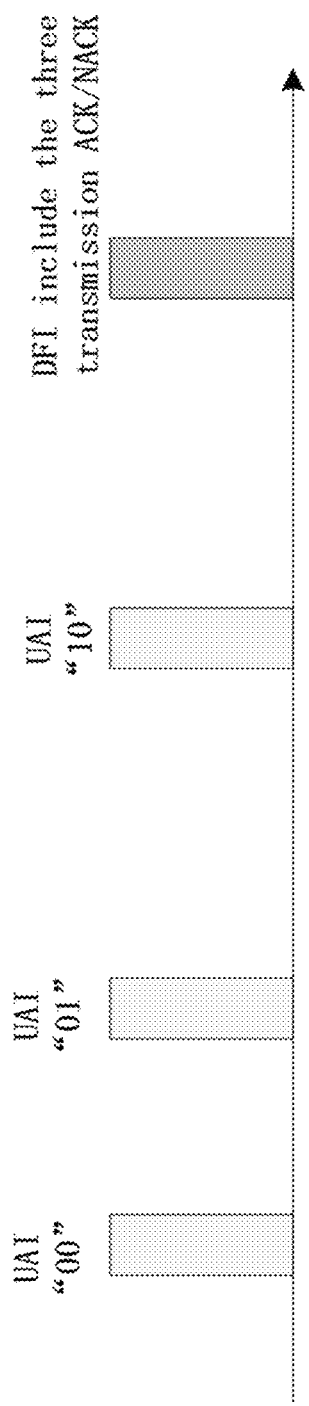
FIG. 2 shows an uplink allocation information (UAI) that indicates a number of physical uplink shared channels (PUSCHs) that the base station has to feedback

Option 3: DFI uses the dynamic codebook to perform joint feedback of TB and CBG. The following implementation example further describes Option 3 (and corresponds to Application Example 2 section below in this patent document). As an example, the UE sends the uplink allocation information (UAI) to carry the corresponding HARQ-ACK codebook size in the DFI to be fed back by the base station, that is, the number of PUSCHs sent by the UE so far. When the base station performs HARQ-ACK feedback, it first performs TB level bitmap feedback, and then feeds back the ACK/NACK information associated with each transmitted CBG of the TB. Further, the UAI information belongs to the uplink control information (UCI) and is carried by the physical uplink control channel (PUCCH) or the PUSCH. Further, the CBG sent by the UE is indicated by using the CBG transmission information (CBGTI) information transmitted by the UE and received by a base station. As an example, the UE may indicate a number of CBGs using a bitmap so that each CBG of the TB can correspond to one bit so that if the TB has four CBG, the CBGTI may be four bits. Thus, the UAI shown in FIG. 2 indicates the number of PUSCHs that the base station may have to feed back.

Figure 3:
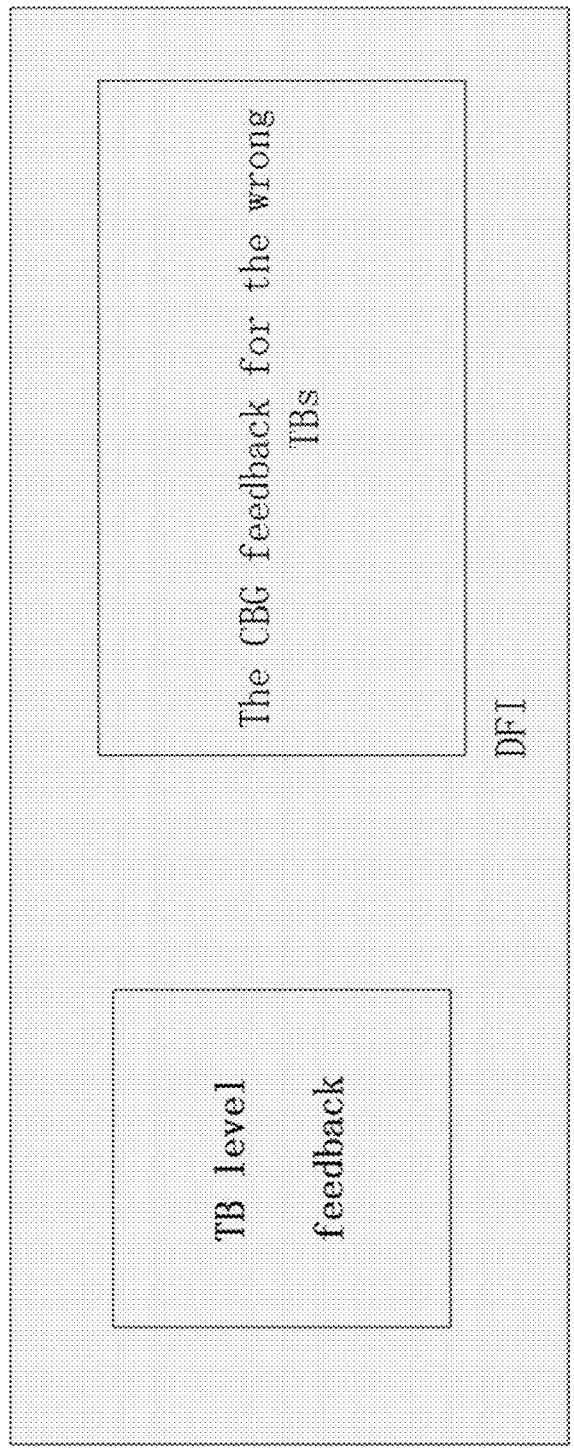
FIG. 3 shows a transport block (TB) level feedback and the CBG level feedback using separate coding method.

Option 4: TB-level feedback and CBG feedback adopt independent coding, where ACK information or the NACK information for the TB s and the ACK information or the NACK information for at least some of the CBGs are independently coded. The HARQ-ACK codebook feedback for CBG can includes only the NACK information for at least some of the CBGs that may be incorrectly decoded by the base station, where the base station does not feedback ACK information for the CBGs if all the CBGs in one TB are fully correctly decoded. The implementation example described in Application Example 3 section below further describes Option 4. Further, the method of Option 4 can be used for the semi-static codebooks in Option 1 and Option 2, and can also be used in the dynamic codebook feedback in Option 3. FIG. 3 shows the TB level feedback and the CBG level feedback using separate coding method as described in Option 4 above.

Method 3: The DFI fed back by the base station only includes the HARQ-ACK feedback of the CBGs, and does not need to perform TB level feedback. Method 3 is further described in Application Example 5 section below in this patent document. Specifically, Method 3 includes the following 2 options. Any one of the following 2 options may be employed by Method 3.

Option 1: One-to-one ACK/NACK feedback is performed for each TB configured CBG. For example, for one TB, each CBG feedback is associated with a one bit ACK/NACK information. Furthermore, the base station sends back NACK information to the UE if the UE does not send the CBG.

Option 2: Only the transmitted CBG is fed back with ACK/NACK, and no feedback is sent by a base station if a CBG is not sent or is not received by the base station. The UE transmits the CBGTI through the UCI to the base station along with the data.

Further, the method for transmitting the HARQ-ACK codebook by using the downlink feedback information DFI bearer includes the following example implementation. As an example, DFI is carried by the DCI format corresponding to the specific physical downlink control channel (PDCCH). The time domain location for DFI transmission is determined by one of the following two features:

Feature 1: The location of the DFI transmission is indicated by the channel occupancy time (COT) sharing information in the UCI, and the time domain location of the DFI transmission is n+k indicated by the DCI signaling. Slot n is the location of the DCI corresponding to the search space of the semi-static configuration, and k is the offset slot number.

Feature 2: The transmission slots of the DFI can be offset by two or three slots on the left or right of the slot position of search space which is semi-static configured.

Further, the DFI time domain location includes at least one of the following: (1) the first downlink time slot after the end of the uplink autonomous transmission, the first downlink time slot and the uplink autonomous transmission belong to the same one COT; and (2) the first time slot after a successful channel access performed by the base station.

Section II—Downlink HARQ-ACK Feedback Techniques

The NR-U can improve the probability of successful uplink HARQ-ACK transmission of the UE by any one of the three exemplary methods described below. The transmission of HARQ-ACK codebook includes the ACK/NACK feedback information of: the current COT, or the previous COT corresponding to the PDSCH. The transmission of HARQ-ACK codebook may also include an indicator that indicates that the HARQ-ACK codebook is a re-transmission. In one example, the HARQ-ACK codebook may be re-transmitted in response to the base station not receiving or not correctly detecting the previously transmitted HARQ-ACK codebook. In another example, the HARQ-ACK codebook may be re-transmitted in response to an LBT failure for PUCCH or PUSCH transmission. The transmitting of the HARQ-ACK codebook by the UE is performed by any one of following three methods. The example implementations for the techniques described in Section II are further described in Application Example 6 and 7 below in this patent document.

Method 1: The UE is notified to send the HARQ-ACK feedback by means of DCI triggering or requesting. Further, the dedicated RNTI scrambled DCI or the new DCI format is used to trigger the initial transmission or retransmission of the HARQ-ACK, and the information included in the DCI is the number of COTs, or the HARQ process group identifier, or the HARQ processes that are needed to feedback HARQ-ACK, or the slot number, or slot group ID. Or the DCI further includes CBGTI information to inform the UE of which CBG HARQ-ACK of a certain HARQ process is needed to be fed back.

Figure 4:
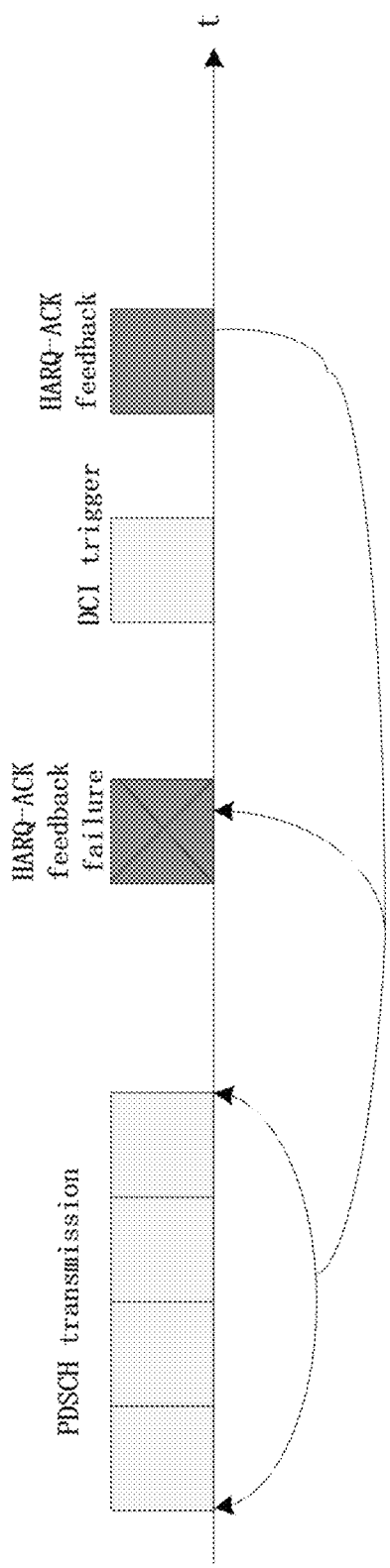
FIG. 4 shows a user equipment re-transmitting a HARQ-ACK codebook in response to receiving a downlink control information (DCI) trigger signal from a base station.

FIG. 4 shows a timing diagram where a UE unsuccessfully transmits a HARQ-ACK feedback, and the base station determines that it has not received a HARQ-ACK feedback and sends a DCI, and the UE transmits or re-transmits the HARQ-ACK feedback in response to receiving the DCI.

Method 2: The UE determine the feedback time slot according to the 3 bits of the PDSCH-to-HARQ-timing-indicator in the DCI, where 1 bit indicates whether same shared COT feedback or cross-COT feedback is selected by a base station, and the other 2 bits indicate the size of the timing amount. The term "same shared COT" can mean that the HARQ-ACK codebook is sent back in the same shared channel occupancy time as the one used for the PDSCH data transmission. The term "cross-COT" can mean that the HARQ-ACK codebook is sent back for a previous channel occupancy time used for PDSCH data transmission. If the same shared COT feedback is determined to be selected, then the timing amount is the number of timing slots relative to the slot in which the DCI is scheduled. If the cross-COT feedback is determined to be selected, the actual transmission time slot of the HARQ-ACK codebook is the position relative to the trigger signaling, and the timing amount indicated by the 2-bit information is the number of offset time slots relative to the time slot of the trigger signaling.

Method 3: HARQ-ACK transmission is sent in a two-step trigger.

The first DCI contains a timing amount that is offset relative to the second DCI or relative to a dedicated signal, where the dedicated signal can include a preamble, PSS/SSS, or CSI-RS. Then, the time when the UE actually transmits the HARQ-ACK codebook depends on the second DCI of the base station or the transmission time of the particular signal sent by the base station, and the UE receives the second DCI or the dedicated signal according to the offset indicated in the first DCI. To determine the transmission location of the HARQ-ACK codebook.

Section III—Beneficial Effects

The example techniques described in this patent document can be used to solve the technical problem of a NR terminal performing HARQ-ACK codebook feedback on the unlicensed carrier. Furthermore, the example techniques can be used to improve the probability of data transmission and system performance. Moreover, one or more solutions are provided for how the base station performs CBG ACK/NACK feedback and schedule retransmission for data autonomously transmitted by the uplink UE, thereby improving the uplink transmission efficiency.

Section IV—Application Examples

The details of some of the techniques described above are further described below through specific application or implementation examples.

Application Example 1

In Application Example 1, a method is for the base station to feedback the semi-static HARQ-ACK codebook corresponding to the UE's autonomous transmission of data. When an unlicensed carrier of the NR is configured to be based on CBG transmission, the UE may perform initial transmission of the CBG during uplink autonomous transmission or perform CBG retransmission based on ACK/NACK feedback corresponding to the CBG of the base station.

For the uplink data transmitted by the UE, the base station may use the following semi-static HARQ-ACK codebook to feedback ACK/NACK of the TB level and the CBG level. The HARQ-ACK fed back by the base station may be an ACK/NACK of all the configured uplink HARQ processes or may be an ACK/NACK corresponding to all the opportunities of the multiple transmission opportunities configured by the UE in a period of time, and the time period may be a configured time window. It can also be a predefined time window size or a configured period. The base station then feeds back the ACK/NACK of the TB level, and then cascades the ACK/NACK of the CBG included in each TB.

For example, the network side configures eight HARQ processes for uplink autonomous transmission for the UE and configures the number of CBGs included in each TB to be two. When the base station feeds back the HARQ-ACK codebook for the autonomous transmission of the uplink, the codebook include 8-bit TB level ACK/NACK according to the HARQ process number from small to large bitmap, and then is an ACK/NACK of the 2*8-bit CBG bitmap, that is, the ACK/NACK order of each CBG corresponds to the cascading. The codebook size is 24 bits. It is assumed that the HARQ-ACK codebook fed back to the UE by the base station is 100010001101010111010101, indicating that all processes 1 and 5 are correctly received, and the second CBG transmission error corresponding to the transport block in the HARQ process 2, 3, 4, 6, 7, 8 is the first. A CBG transmission is correct.

For another example, if the UE configures 4 uplink autonomous transmission opportunities in a period of a predefined or semi-static configuration, the UE sends a maximum of 4 TB blocks, and if the number of CBGs included in each TB configuration is 2, the base station follows the feedback mode of the semi-static codebook, and the feedback HARQ-ACK codebook size should be 12 bits, and the base station that does not detect the UE transmission data on the transmission opportunity feeds back NACK. If the UE has only the last uplink opportunity of the UE, the uplink channel access is successful or only the uplink data is to be sent at the moment, and the base station sends the TB to the correct transmission, the base station can feed back the information of 00000000011. The UE is notified that the TB received by the last transmission opportunity in the time period is received correctly.

The UE then performs retransmission of the CBG based on the above-mentioned HARQ-ACK information fed back by the base station.

Further, the HARQ-ACK codebook information fed back is included in the downlink feedback information DFI, and the method for transmitting the DFI is shown in Application Example 4 below.

Application Example 2

Application Example 2 describes a method for feedback that the UE autonomously transmits to a base station by using a dynamic HARQ-ACK codebook combined with TB and CBG feedback.

Introducing a new uplink control information UAI to indicate the number of autonomously transmitted data packets TB and/or CBGs that have been transmitted by the uplink UE since the last base station feedback HARQ-ACK, and then the base station transmits the number of data packets to the UE according to the information. The TB or CBG performs feedback of the HARQ-ACK codebook. The UAI information is sent with each data transmission, each time having a different size.

The UE carries the UAI information to carry the number of TB s and CBGs that the UE has transmitted so far, and each time the UE transmits, either TB transmission or CBG transmission. If it is a CBG transmission, it carries CBGTI information to inform the base station which CBGs to send. The UAI information is used to notify the base station to transmit the corresponding HARQ-ACK codebook size for the uplink PUSCH to be fed back, corresponding to the TB or CBG sent each time. When the base station feeds back the HARQ-ACK dynamic codebook, it still feeds back the ACK/NACK corresponding to the TB level, and then cascades the ACK/NACK corresponding to the CBG.

For example, the UE first sends a PUSCH of one TB, and then sends two CBGs whose PUSCH is one TB and tells the base station that the PUSCH carries the last two CBGs of one TB through the CBGTI information 0011 carried by itself. The UAI tells the base station that 3 TBs and CBGs have been sent so far, and then the base station is responsive to the TB and CBG corresponding to the two transmissions. The size of the HARQ-ACK codebook is 3 bits, and the first 1 bit corresponds to the first TB. ACK/NACK, the latter 2 bits correspond to the ACK/NACK of the two CBGs transmitted for the second time. For example, the base station feedback 101 indicates that the first TB reception is correct, the first CBG transmission error in the second transmission, and the second CBG transmission is correct.

Feedback overhead can be reduced by using dynamic codebook feedback. Similar to the application example 1 above, the feedback dynamic HARQ-ACK codebook information is included in the downlink feedback information DFI, and the transmission method for the DFI is shown in the following Application Example 4.

Application Example 3

In Application Example 3, the TB level ACK/NACK feedback sent by the base station and the CBG corresponding ACK/NACK feedback are sent in an independent coding manner. This method is used for both semi-static codebooks and dynamic codebooks.

Specifically, the base station first encodes the ACK/NACK information of the TB, and then performs coding feedback on the ACK/NACK information of the CBG corresponding to the TB feedback of the NACK. That is, the second part of the codebook size depends on the number of erroneous TBs in the first part of the feedback. For example, if the number of erroneous TBs is three, and the number of CBGs that the UE configures for one TB is four, the size of the HARQ-ACK codebook corresponding to the CBG fed back by the second part is 3*4=12 bits.

Further, the two pieces of feedback information are carried by one PDCCH or two PDCCHs.

The UE first detects and demodulates the TB-level HARQ-ACK codebook when receiving the HARQ-ACK feedback information, and then determines, according to the demodulation result, the HARQ-ACK codebook size corresponding to the demodulated CBG level to be detected and receives. demodulation.

In this way, the feedback signaling overhead caused by the ACK feedback of the CBG corresponding to the correct TB can be saved. Similar to Application Example 1 and Application Example 2, the feedback TB and CBG corresponding HARQ-ACK codebook information is included in the downlink feedback information DFI, and the transmission method for the DFI is shown in the following Application Example 4.

Application Example 4

Application Example 4 describes a method of transmitting DFI. The DFI is downlink feedback information and is mainly for the ACK/NACK result of demodulation of the PUSCH transmitted by the UE. The DFI is carried by DCI format 0_0 or DCI format 0_1, or by a new DCI format. In addition to transmitting the DFI, the DCI further includes at least one of the following information: 1-bit indication information, which is used to distinguish whether the DCI is a DCI for scheduling PUSCH transmission or a DCI for feeding back ACK/NACK for uplink transmission, and information related to transmit power control (TPC), bandwidth part (BWP) index information, carrier indication information.

The number of bits of the HARQ-ACK included in the DFI is determined by the following two methods:

Method 1: The number of HARQ-ACK code bits included in the DFI is semi-statically configured. For example, a HARQ process set is configured semi-statically, and the base station feeds back the HARQ-ACK of the PDSCH corresponding to the set of the process, and the sequence is performed from small to large according to the size of the process number.

Or the semi-static codebook size corresponding to the DFI is a HARQ-ACK feedback corresponding to the number of times of the pre-configured transmission of the configured grant data in a pre-configured time window. As shown in FIG. 1, pre-configuring four transmission opportunities, then DFI. The corresponding number of bits is 4.

Method 2: The number of HARQ-ACK code bits included in the DFI is determined by the UAI.

Specifically, the UAI information carries the number of TB s and CBGs that the UE has transmitted so far, and each time the UE transmits, either TB transmission or CBG transmission. If it is a CBG transmission, it carries CBGTI information to inform the base station which CBGs to send. The UAI information is used to notify the base station to transmit the corresponding HARQ-ACK codebook size for the uplink PUSCH to be fed back.

When the number of bits of the DFI is smaller than the number of bits corresponding to the DCI format, the PDCCH size including the DFI and the corresponding DCI format size alignment are implemented by padding zero.

The DFI information is then encoded by the polar code, then modulated, mapped to the corresponding time domain location and CORESET. According to the current definition of NR's search space, the current DCI location is semi-statically configured. For NR-U, the location of DFI transmission should be dynamically changed.

The time domain location for DFI transmission is determined by the following method:

Method 1: The location of the DFI transmission is indicated by the COT sharing information in the UCI, and the location of the DFI transmission of the n+k indicated by the signaling is the location of the DCI corresponding to the search space of the semi-static configuration.

Method 2: The sending position of the DFI can be offset by two or three slots from the left and right positions of the semi-static configuration search space.

Further, the DFI time domain location includes at least one of the following: (1) the first downlink time slot after the end of the uplink autonomous transmission, the time slot and the uplink autonomous transmission belong to the same one COT; and (2) he first time slot after the base station channel access is successful.

Then, according to the configured location and the shared relationship of the COT, the UE may determine whether the subsequent autonomously transmitted PUSCH performs non-adaptive retransmission transmission in the corresponding time domain location blind detection DFI.

Application Example 5

Application Example 5 describes a process in which the DFI on the unlicensed carrier performs HARQ-ACK feedback on each TB and CBG transmitted.

The autonomous transmission process based on CBG is as follows:

First, after the terminal successfully performs the LBT, it transmits one CBG of one TB or multiple CBGs of one TB continuously in the same cycle. At the same time, the terminal includes CBGTI information in the UCI to indicate which one or which CB Gs are autonomous transmission of the TB. The CBGs share the same HARQ process, and the terminal notifies the base station of the process number, and uses the new data indicator (NDI) information to Indicates whether this HARQ process is a new TB transmitted or a CBG retransmission of the original TB.

For example, if the base station is semi-statically configured, the number of CBGs included in one TB is four. After the UE transmits a TB for the first time through the HARQ process 2, the base station feeds back NACK information, and the UE can select only some of the TB s during retransmission. The CBG performs retransmission. For example, the terminal may carry 0011 in the UCI to indicate that only CBG2 and CBG1 are retransmitted, and the information is sent to the base station along with the HARQ process number 2 and the NDI information. After receiving the information, the base station knows the terminal. This transmission is a retransmission of the original TB CBG1 and CBG2 of Process 2. For redundancy version (RV) information, the RVs of the multiple CBGs are the same, and the RVs used for retransmission are sent in a predefined order, such as 0, 2, 1, and 3. Or the UE's own UCI carries RV information.

After receiving the data transmission, the base station feeds back the ACK/NACK information corresponding to all autonomously transmitted CBGs according to the bitmap and transmits them through DFI.

In addition, the CBG sent by the UE may also be a CBG retransmission of the corresponding HARQ process performed on the ACK/NACK feedback information of the CBG in the DFI information that is sent back by the base station, so that the UE can carry the CBGTI information without carrying the HARQ process. The number and the NDI, then the base station knows which CBG the UE is retransmitting based on this information and the ACK/NACK information that was last fed back.

Application Example 6

The process of the HARQ-ACK corresponding to the PDSCH sent by the uplink feedback base station is described in Application Example 6.

The UEs can be configured as the HARQ-ACK feedback mode of the COT, because the UEs have different capabilities and some of the UEs have strong data processing capabilities and can demodulate and feedback HARQ-ACKs after receiving the PDSCH. Specifically, the feedback of the COT is implemented by one of the following methods:

Method 1: Predetermine that all HARQ-ACK feedbacks corresponding to all PDSCHs in a COT are transmitted on the PUCCH or PUSCH of the last slot of the COT.

Method 2: Semi-statically configure the location of the HARQ-ACK feedback corresponding to all PDSCHs transmitted in one COT. This location is determined by configuring the resources of the PUCCH.

Method 3: Dynamically indicate the location of all PDSCH corresponding HARQ-ACK transmissions in one COT through DCI. Specifically, it includes two options.

Option 1: A common DCI is used to notify all UEs that a certain time slot is a PUCCH time slot, and is used for the UE to perform HARQ-ACK feedback on all PDSCHs in the current COT.

Option 2: The time slot position of the HARQ-ACK feedback corresponding to the PDSCH is scheduled by the PDSCH-to-HARQ-timing-indicator parameter in the UE-specific DCI.

In the above two options, the UE can transmit the ACK/NACK corresponding to all PDSCHs of the present COT without performing LBT or performing a Type 2 LBT in the last time slot of a COT, where the HARQ-ACK includes TB level and CBG ACK/NACK.

Application Example 7

Application Example 7 describes how the UE implements HARQ-ACK feedback across the COT (also known as "cross-COT feedback"). The restrictions for cross-COT include the following two cases:

Case 1: Due to the limitation of the processing capability of the UE, some UEs cannot quickly feedback the corresponding HARQ-ACK in the COT after receiving the PDSCH, especially the PDSCH scheduled after the COT. At this time, it is necessary to feed back HARQ-ACK in the next COT.

Further, the next COT may be initiated after the base station performs the channel access process successfully, or may be initiated by the UE itself to perform channel access.

Further, HARQ-ACK feedback across the COT may be performed by one of the following options.

Option 1: The indication across the COT is implemented by increasing the value of the existing PDSCH-to-HARQ-timing-indicator. For example, the number of bits of the PDSCH-to-HARQ-timing-indicator is increased to 6 bits, or the meaning of the existing 3 bits is modified, and a value of 9 is added as a final timing amount.

Option 2: The original 3 bits of the PDSCH-to-HARQ-timing-indicator in the DCI are revised.

If 1 bit indicates whether the same shared COT feedback or the cross-COT feedback are selected by the base station, and then 2 bits indicate the size of the timing quantity. If it is the same shared COT feedback, the timing quantity is the number of time slots relative to the slot where the DCI is located.

If it is the cross-COT feedback, the position is determined by the position relative to the trigger signaling, and the timing amount indicated by the 2-bit information is the number of offset slots relative to the slot of the trigger signaling.

Case 2: For the HARQ-ACK feedback of the present COT, since the UE needs to perform channel access before the HARQ-ACK transmission, and the result is that the HARQ-ACK feedback of the COT is not successfully transmitted, the base station cannot receive the COT scheduling. The HARQ-ACK information corresponding to the PDSCH, the base station needs to trigger the UE or request the UE to resend the HARQ-ACK information of the previous COT. Then, the base station can perform retransmission of the original COT corresponding HARQ-ACK in one of the following two methods.

Method 1:

The DCI triggers the HARQ-ACK to report the retransmission. For example, a dedicated RNTI scrambled DCI or a new DCI format is used to trigger the retransmission of the HARQ-ACK, the information included is the COT number information, or the HARQ process group identifier information, or the HARQ process bitmap is used to indicate the retransmission. The HARQ process, either indicating the slot number, or the bitmap of the last retransmitted slot of the transmitted frame.

Method 2:

The retransmission of the HARQ-ACK is triggered by a dedicated signal. For example, a signal consisting of at least one of preamble, PSS/SSS, and CSI-RS is defined, and after detecting the signal, the UE performs retransmission of the HARQ-ACK codebook corresponding to the previous COT. Further, the UE detects the location of the signal as the initial slot of the next COT. The UE first detects the start of the next COT and then detects the signal. The cross-COT feedback of the HARQ-ACK and the probability of successful transmission can be achieved by the method mentioned in this application example.

Figure 6:
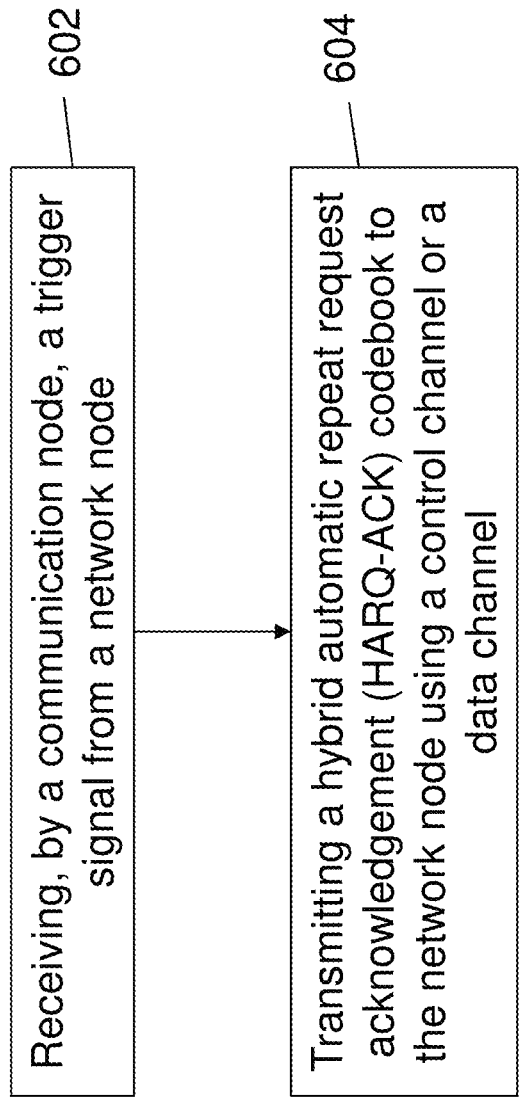
FIG. 6 shows an exemplary flowchart for a downlink HARQ-ACK feedback.

FIG. 6 shows an exemplary flowchart for a downlink HARQ-ACK feedback. At the receiving operation 602, a communication node receives a trigger signal from a network node. At the transmitting operation 604, the communication node transmits, after receiving the trigger signal, a hybrid automatic repeat request acknowledgement (HARQ-ACK) codebook to the network node using a control channel or a data channel.

In some embodiments, the transmission of the HARQ-ACK codebook includes an acknowledgement (ACK) information or a non-acknowledgement (NACK) information of: a current channel occupancy time (COT), or a previous COT corresponding to a physical downlink shared channel (PDSCH). In some embodiments, the transmission of the HARQ-ACK codebook includes an indication that the HARQ-ACK codebook is a re-transmission.

In some embodiments, the transmitting of the HARQ-ACK codebook is performed by: (1) transmitting the HARQ-ACK codebook in response to receiving a downlink control information (DCI) trigger or request, where the DCI is a dedicated radio network temporary identifier (RNTI) scrambled DCI or a new DCI format bearer, where the DCI includes information related to a number of COTs, a HARQ process group identifier, HARQ processes needed to transmit the HARQ-ACK codebook of a retransmission using a HARQ process bitmap, a slot number, a slot combination or a slot group identifier (ID), or a code block group transmission information (CBGTI) information, where the CBGTI informs the communication node which code block group (CBG) HARQ-ACK of a certain HARQ process is needed to be fed back; or (2) determining, by the communication node, a time slot for transmitting the HARQ-ACK codebook, where the time slot is determined according to three bits of a physical downlink shared channel (PDSCH)-to-HARQ-timing-indicator in the DCI, where one bit of the three bits indicates that either a same shared channel occupancy time (COT) feedback or a cross-COT feedback is selected, where two other bits of the three bits indicate a size of a timing amount, where in response the one bit indicating the same shared COT feedback, the timing amount is a number of timing slots relative to a slot where the DCI is located, where in response to the one bit indicating the cross-COT feedback, a transmission time of the HARQ-ACK codebook is a position relative to the trigger signal and the timing amount is a number of offset time slots relative to a time slot of the trigger signal; or (3) determining a time domain location of the HARQ-ACK codebook by using a two-step trigger, where in response to a first DCI containing a timing amount that is offset relative to a second DCI or relative to a dedicated signal, the time domain location of the HARQ-ACK codebook depends on the second DCI or a transmission time of the particular signal sent by the network node, where the communication node receives the second DCI or the dedicated signal according to an offset indicated in the first DCI.

Figure 7:
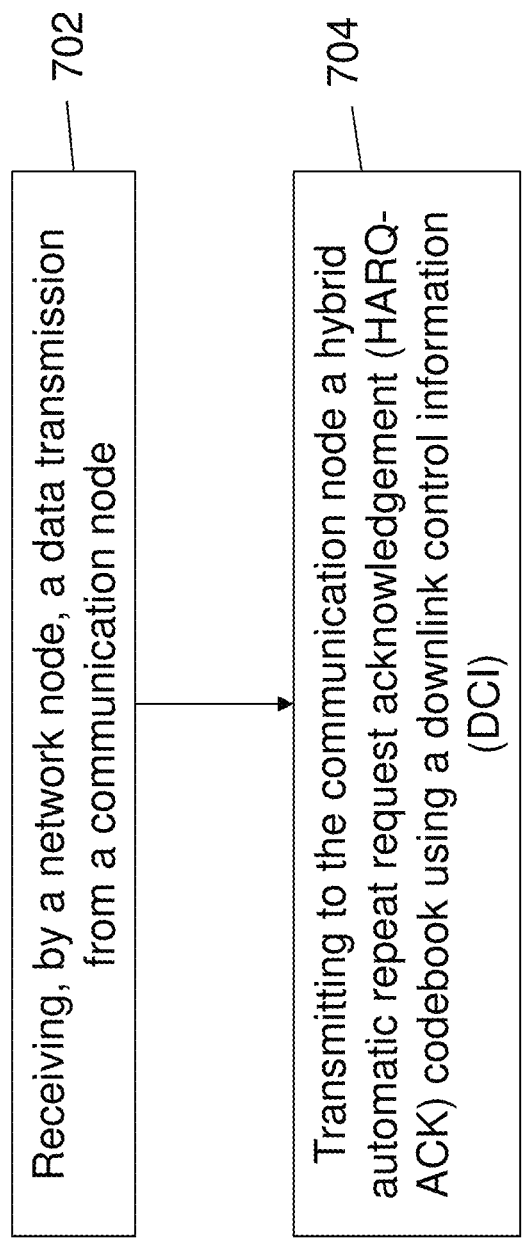
FIG. 7 shows an exemplary flowchart for an uplink HARQ-ACK feedback.

FIG. 7 shows an exemplary flowchart for an uplink HARQ-ACK feedback. At the receiving operation 702, the network node receives a data transmission from a communication node. At the transmitting operation 704, the network node transmits to the communication node a hybrid automatic repeat request acknowledgement (HARQ-ACK) codebook using a downlink control information (DCI), where the HARQ-ACK codebook is based on the received data transmission.

In some embodiments, the received data transmission includes a plurality of code block groups (CBGs) based physical uplink shared channel (PUSCH) autonomous transmission, and the network node transmits the HARQ-ACK codebook by: (1) the network node transmits the HARQ-ACK codebook that corresponds to at least one transport block (TB) for PUSCH autonomous transmission, and a corresponding acknowledgement (ACK) information or non-acknowledgement (NACK) information that is sequentially cascaded according to the PUSCH autonomous transmission, where the ACK information or the NACK information is carried by a downlink feedback information (DFI), and where the DCI is used to schedule re-transmission of the CBGs of the TB, and where the TB includes the CBGs; or (2) the network node adopts a joint feedback mode where the HARQ-ACK codebook includes information for the TB and the CBGs, where the HARQ-ACK codebook is carried by the DFI; or (3) the network node transmits the HARQ-ACK codebook that includes information for the CBGs and excludes information for the TB.

In some embodiments, the network node adopts the joint feedback mode by having: (1) the HARQ-ACK codebook include the ACK information or the NACK information associated with the TB and the CBGs configured for all autonomous transmission processes of the communication node, where the ACK information or the NACK information of the TB is formed according to a HARQ process bitmap, and where the ACK information or the NACK information of the CBGs is formed according to a CBG bitmap and sequentially cascaded corresponding to each TB; or (2) the HARQ-ACK codebook correspond to a number of pre-configured data transmission opportunities in a pre-configured time window, where the HARQ-ACK codebook includes information related to the TB and the cascaded feedback of the CBGs, where the network node transmits the HARQ-ACK codebook that includes the NACK information in response to detecting an absence of PUSCH transmission in a transmission opportunity, and where the communication node refrains from performing data transmission in the transmission opportunity.

In some embodiments, the HARQ-ACK codebook of the joint feedback mode is a dynamic HARQ-ACK codebook, the network node receives an uplink allocation information (UAI) to carry the HARQ-ACK codebook feedback related information to be fed back by the network node in the DFI, and the network node transmits the HARQ-ACK codebook by sending a bitmap of the TB and then sending the ACK information or the NACK information associated with each CB G of the TB.

In some embodiments, the UAI belongs to an uplink control information (UCI) and is carried by a physical uplink control channel (PUCCH) or the PUSCH, and a number of the CBGs is indicated by using the CBG transmission information (CBGTI) received by the network node. In some embodiments, the network node adopts the joint feedback mode by independently coding the ACK information or the NACK information for the TB and the ACK information or the NACK information for at least some of the CBGs, the HARQ-ACK codebook information for the CBGs includes the NACK information for the at least some of the CBGs of the TB in response to the at least some of the CBGs being incorrectly decoded, and the HARQ-ACK codebook information for the CBGs does not include the ACK information for the CBGs in response to all of the CBGs of the TB being correctly decoded.

In some embodiments, the HARQ-ACK codebook that includes information for the CBGs and excludes information for the TB includes: (1) a one-bit ACK information or NACK information is provided for each CBG of each TB, where the NACK information is sent for a CBG not received by the network node, or (2) the HARQ-ACK codebook for the CBGs includes the ACK information or the NACK information, and the network node refrains from transmitting the HARQ-ACK codebook in response to detecting an absence of a CBG sent by the communication node, where the network node receives the CBG transmission information (CBGTI) through an uplink control information (UCI) and the data transmission.

In some embodiments, the DFI is carried by a DCI format corresponding to a physical downlink control channel (PDCCH). In some embodiments, a time domain location of the DFI is determined by following: (1) the time domain location of the DFI is indicated by a channel occupancy time (COT) sharing information in an uplink control information (UCI), where the time domain location of the DFI is a sum of a slot number n and a offset slot number k, where n is associated with a location of the DCI corresponding to a search space of a semi-static configuration, where k is indicated by the DCI; or (2) transmission slots of the DFI is offset by two or three slots from a left position or a right position of the search space of the semi-static configuration. In some embodiments, a time domain location of DFI includes following: (1) a first downlink time slot after an end of the autonomous transmission, where the first downlink time slot and the autonomous transmission belong to a same shared channel occupancy time (COT); or (2) a first time slot after a successful channel access performed by the network node.

Figure 8:
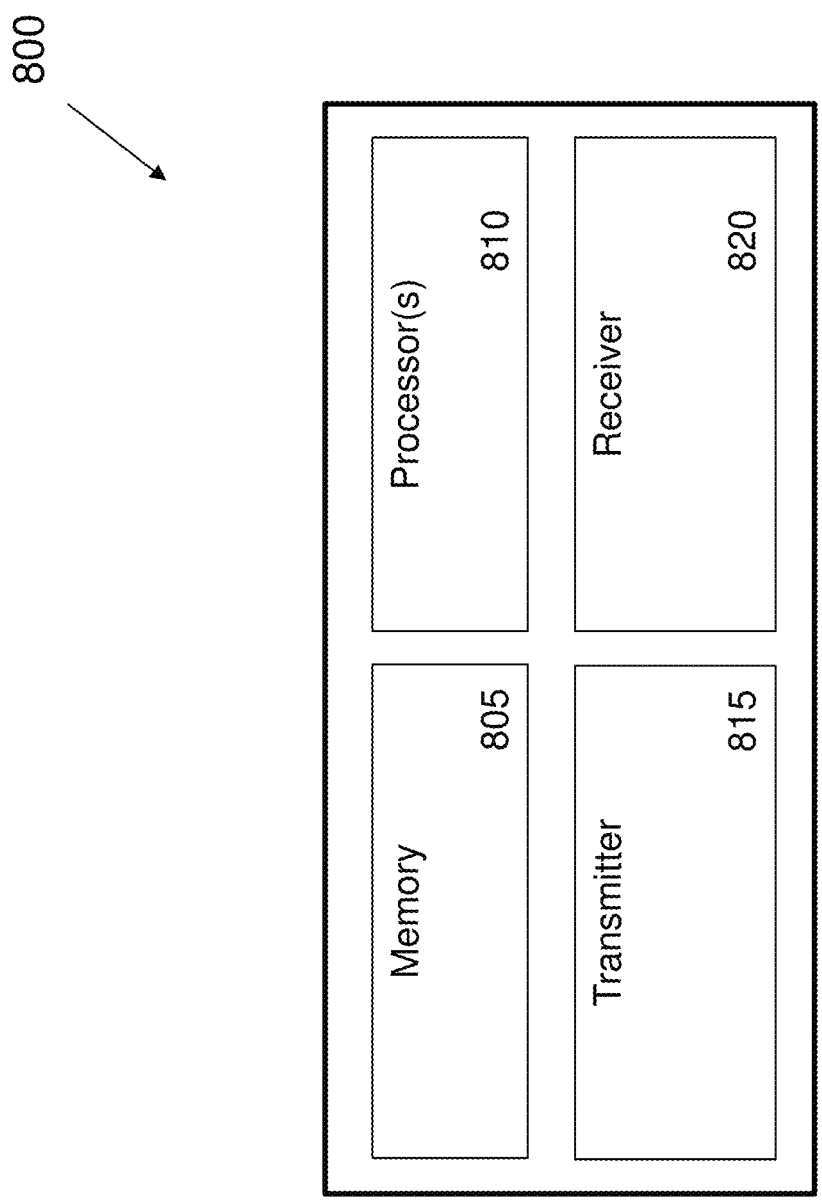
FIG. 8 shows an exemplary block diagram of a hardware platform that may be a part of a network node or a communication node.

FIG. 8 shows an exemplary block diagram of a hardware platform 800 that may be a part of a network node (e.g., a base station) or a communication node (e.g., a user equipment). The hardware platform 800 includes at least one processor 810 and a memory 805 having instructions stored thereupon. The instructions upon execution by the processor 810 configure the hardware platform 800 to perform the operations described in FIGS. 1 to 7 and in the various embodiments described in this patent document. The transmitter 815 transmits or sends information or data to another node. For example, a network node transmitter can send HARQ-ACK codebook to a communication node. The receiver 820 receives information or data transmitted or sent by another node. For example, the user equipment can receive the HARQ-ACK codebook from the network node.

In this document the term "exemplary" is used to mean "an example of" and, unless otherwise stated, does not imply an ideal or a preferred embodiment. In this document the term "any one of" is used to mean one of the described options or features for a method, or two or more of the described options or features for a method.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   receiving, by a network node, a data transmission from a communication node; and
   transmitting to the communication node a hybrid automatic repeat request acknowledgement (HARQ-ACK) codebook in a downlink feedback information (DFI) in a downlink control information (DCI), wherein the HARQ-ACK codebook is based on the received data transmission,
   wherein a physical downlink control channel (PDCCH) includes the DFI and a DCI format associated with the DCI, and
   wherein the PDCCH includes one or more padded zeros in response to a number of bits of the DFI being less than another number of bits corresponding to the DCI format associated with the DFI.

2. The method of claim 1, wherein the DCI includes a 1-bit indication information that distinguishes whether the DCI is used for scheduling an uplink transmission or for feeding back an acknowledgement or non-acknowledgement for an uplink transmission.

3. The method of claim 1, wherein the DCI includes information related to a transmit power control (TPC).

4. The method of claim 1, wherein the DCI includes a carrier indication information.

5. The method of claim 1, wherein the DFI is carried by a DCI format 0_1.

6. The method of claim 1,
   wherein the HARQ-ACK codebook corresponds to a number of pre-configured data transmission opportunities in a pre-configured time window,
   wherein the HARQ-ACK codebook includes a first set of bits corresponding to a cascading of a plurality of transport blocks (TBs) received in the data transmission in the pre-configured time window, and
   wherein the HARQ-ACK codebook includes a second set of bits corresponding to a cascading of a plurality of code block groups (CBGs) within each transport block.

7. A wireless communication method, comprising:
   transmitting, by a communication node, a data transmission to a network node; and
   receiving, by the communication node, a hybrid automatic repeat request acknowledgement (HARQ-ACK) codebook in a downlink control feedback information (DFI) in a downlink control information (DCI), wherein the HARQ-ACK codebook is based on the data transmission received by the network node, wherein a physical downlink control channel (PDCCH) includes the DFI and a DCI format associated with the DCI, and wherein the PDCCH includes one or more padded zeros in response to a number of bits of the DFI being less than another number of bits corresponding to the DCI format associated with the DFI.

8. The method of claim 7, wherein the DCI includes a 1-bit indication information that distinguishes whether the DCI is used for scheduling an uplink transmission or for feeding back an acknowledgement or non-acknowledgement for an uplink transmission.

9. The method of claim 7, wherein the DCI includes information related to a transmit power control (TPC).

10. The method of claim 7, wherein the DCI includes a carrier indication information.

11. The method of claim 7, wherein the DFI is carried by a DCI format 0_1.

12. The method of claim 7,
wherein the HARQ-ACK codebook corresponds to a number of pre-configured data transmission opportunities in a pre-configured time window,
wherein the HARQ-ACK codebook includes a first set of bits corresponding to a cascading of a plurality of transport blocks (TBs) transmitted in the data transmission in the pre-configured time window, and
wherein the HARQ-ACK codebook includes a second set of bits corresponding to a cascading of a plurality of code block groups (CBGs) within each transport block.

13. An apparatus for wireless communication comprising a processor, configured to implement a method, comprising:
receive, by a network node, a data transmission from a communication node; and
transmit to the communication node a hybrid automatic repeat request acknowledgement (HARQ-ACK) codebook in a downlink control feedback information (DFI) in a downlink control information (DCI), wherein the HARQ-ACK codebook is based on the received data transmission,
wherein a physical downlink control channel (PDCCH) includes the DFI and a DCI format associated with the DCI, and
wherein the PDCCH includes one or more padded zeros in response to a number of bits of the DFI being less than another number of bits corresponding to the DCI format associated with the DFI.

14. The apparatus of claim 13, wherein the DCI includes a 1-bit indication information that distinguishes whether the DCI is used for scheduling an uplink transmission or for feeding back an acknowledgement or non-acknowledgement for an uplink transmission.

15. The apparatus of claim 13, wherein the DCI includes information related to a transmit power control (TPC).

16. The apparatus of claim 13,
wherein the HARQ-ACK codebook corresponds to a number of pre-configured data transmission opportunities in a pre-configured time window,
wherein the HARQ-ACK codebook includes a first set of bits corresponding to a cascading of a plurality of transport blocks (TBs) received in the data transmission in the pre-configured time window, and
wherein the HARQ-ACK codebook includes a second set of bits corresponding to a cascading of a plurality of code block groups (CBGs) within each transport block.

17. An apparatus for wireless communication comprising a processor, configured to implement a method, comprising:
transmit, by a communication node, a data transmission to a network node; and
receive, by the communication node, a hybrid automatic repeat request acknowledgement (HARQ-ACK) codebook in a downlink feedback information (DFI) in a downlink control information (DCI), wherein the HARQ-ACK codebook is based on the data transmission received by the network node,
wherein a physical downlink control channel (PDCCH) includes the DFI and a DCI format associated with the DCI, and
wherein the PDCCH includes one or more padded zeros in response to a number of bits of the DFI being less than another number of bits corresponding to the DCI format associated with the DFI.

18. The apparatus of claim 17, wherein the DCI includes a 1-bit indication information that distinguishes whether the DCI is used for scheduling an uplink transmission or for feeding back an acknowledgement or non-acknowledgement for an uplink transmission.

19. The apparatus of claim 17, wherein the DCI includes information related to a transmit power control (TPC).

20. The apparatus of claim 17,
wherein the HARQ-ACK codebook corresponds to a number of pre-configured data transmission opportunities in a pre-configured time window,
wherein the HARQ-ACK codebook includes a first set of bits corresponding to a cascading of a plurality of transport blocks (TBs) transmitted in the data transmission in the pre-configured time window, and
wherein the HARQ-ACK codebook includes a second set of bits corresponding to a cascading of a plurality of code block groups (CBGs) within each transport block.

* * * * *

UNITED STATES PATENT AND TRADEMARK OFFICE
CERTIFICATE OF CORRECTION

PATENT NO. : 11,929,832 B2
APPLICATION NO. : 17/350851
DATED : March 12, 2024
INVENTOR(S) : Li et al.

Page 1 of 1

It is certified that error appears in the above-identified patent and that said Letters Patent is hereby corrected as shown below:

In the Claims
In Column 18, Line 64, in Claim 7, delete "control feedback" and insert --feedback--, therefor.
In Column 19, Line 36, in Claim 13, delete "control feedback" and insert --feedback--, therefor.

Signed and Sealed this
Thirtieth Day of April, 2024

Katherine Kelly Vidal
*Director of the United States Patent and Trademark Office*